3,449,419
Patented June 10, 1969

3,449,419
(4-PHENOXY-3,5-DIHALOPHENYL)ALKANO-AMIDES
William J. Wechter, Kalamazoo, Mich., assignor to The Upjohn Company, Kalamazoo, Mich., a corporation of Delaware
No Drawing. Filed Aug. 24, 1966, Ser. No. 574,580
Int. Cl. C07c *103/04, 87/32, 103/22*
U.S. Cl. 260—559    3 Claims

---

ABSTRACT OF THE DISCLOSURE (4-phenoxy-3,5-dihalophenyl)alkanoamides having the formula:

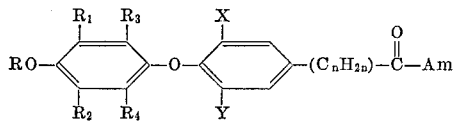

where R, $R_3$ and $R_4$ are hydrogen and lower-alkyl; $R_1$ and $R_2$ are hydrogen, lower-alkyl, and halogen; X and Y are halogen; $n$ is an integer from zero to 3, inclusive; and Am is di-lower-alkylamino. The compounds are cholesterol lowering agents.

---

This invention relates to novel alkanoamides and, more particularly, to (4-phenoxy-3,5-dihalophenyl)alkanoamides having the formula:

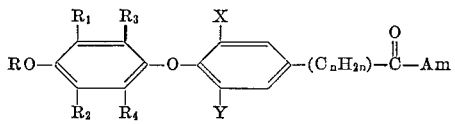

wherein R is selected from the group consisting of hydrogen and lower-alkyl; $R_1$ and $R_2$ are selected from the group consisting of hydrogen, lower-alkyl, and halogen; $R_3$ and $R_4$ are selected from the group consisting of hydrogen and lower-alkyl; X and Y are halogen; $n$ is an integer from zero to 3, inclusive; and Am is an amino moiety selected from the group consisting of amino (—$NH_2$), lower-alkylamino, di-lower-alkylamino, and the heterocyclic moieties, pyrrolidino, piperidino, hexamethylenimino, heptamethylenimino, octamethylenimino, morpholino, and 4-lower-alkylpiperazino, each of said heterocyclic moieties having attached as substituents on carbon atoms thereof zero to 3 lower-alkyls, inclusive, a nitrogen atom of each of said heterocyclic moieties being the point of attachment of Am to the carbonyl in said formula. When Am is di-lower-alkylamino, the alkyls can be alike or different. When Am is a heterocyclic moiety, the alkyls which can be attached thereto can all be different or any two or all of them can be alike.

The term "lower-alkyl" as used herein means alkyl of 1 to 4 carbon atoms, inclusive, e.g., methyl, ethyl, propyl, butyl, and isomeric forms thereof. The term "halogen" means fluorine, chlorine, bromine, and iodine.

Examples of heterocyclic moieties within the scope of Am, in addition to those already mentioned above, are 2-mthylpyrrolidino, 2-ethylpyrrolidino, 2-isopropylpyrrolidino, 3-butylpyrrolidino, 2-sec-butylpyrrolidino, 2,2-dimethylpyrrolidino, 3,4-dimethylpyrrolidino, 2,3,5-trimethylpyrrolidino, 2-methylpiperidino, 3-methylpiperidino, 4-methylpiperidino, 2-propylpiperidino, 4-isopropylpiperidino, 2-butylpiperidino, 4-tert-butylpiperidino, 2-methyl-5-ethylpiperidino, 3,4-diethylpiperidino, 2,4,6-trimethylpiperidino, 2-methylhexamethylenimino, 3,6-dimethylhexamethylenimino, 2,2-di-butylhexamethylenimino, 2-methylheptamethylenimino, 3-methyloctamethylenimino, 2-ethylmorpholino, 2-ethyl-5-methylmorpholino, 3,3-dimethylmorpholino, 4-methylpiperazino, 4-isopropylpiperazino, 4-butylpiperazino, 2,4,5-trimethylpiperazino, and the like.

The (4 - phenoxy-3,5-dihalophenyl)alkanoamides of Formula I can be prepared by subjecting an alkyl (4-phenoxy-3,5-dihalophenyl)-alkonoate having the formula:

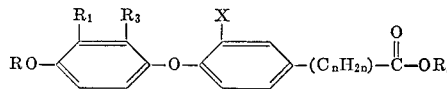

wherein R, $R_1$, $R_2$, $R_3$, $R_4$, X, Y and $n$ are as defined above, and $R_5$ is alkyl of 1 to 8 carbon atoms, inclusive, e.g., methyl, ethyl, propyl, butyl, pentyl, hexyl, heptyl, octyl, and isomeric forms thereof, to aminolysis (including ammonolysis) with a basic nitrogenous compound Am-H wherein Am is as defined above. Accordingly, the compound Am-H can be ammonia; or it can be a primary or secondary amine, more particularly, a lower-alkylamine, a di-lower-alkyl-amine, or a heterocyclic secondary amine, examples of such amines being given below.

The aminolysis reaction can be carried out in accordance with procedures known in the art for the aminolysis of alkyl esters of carboxylic acids. Illustratively, the Formula II alkyl ester and the basic nitrogenous compound Am-H are mixed in the presence of an inert diluent such as methanol, ethanol, 1-propanol, 2-propanol, 1-butanol, benzene, toluene, xylene, cumene, cymene, and the like. Stoichiometrically, equimolar amounts of the reactants are required, but it is generally preferred to employ the compound Am-H in excess. The reaction can be carried out in a closed system (e.g., tube or autoclave) or in an open system. In many instances, it is advantageous to azeotropically remove methanol, ethanol, or other alkanol as it is formed during the reaction, particularly when using inert hydrocarbon diluents of the kind mentioned above. In general, reaction times ranging from about 2 hours to about 48 hours, and reaction temperatures ranging from about 25° C. to about 200° C., are suitable. It will, of course, be understood that some of the ester reactants are more reactive than others and that similar considerations apply to the basic nitrogenous reactants; therefore, the choice of the optimum reaction conditions for any specific mixture is within the judgment of the skilled chemist. When the reaction has been completed, the desired (4-phenoxy-3,5-dihalophenyl)alkanoamide of Formula I can be isolated and purified by conventional procedures such as evaporation of the reaction mixture, recrystallization, chromatography, and the like.

Representative lower-alkylamines which can be utilized in the process of this invention include methylamine, ethylamine, propylamine, isopropylamine, butylamine, sec.-butylamine, and the like. Representative di-lower-alkylamines which can be utilized include dimethylamine, diethylamine, diisopropylamine, diisobutylamine, dibutylamine, N-methylethylamine, N-ethylbutylamine, and the like. Representative heterocyclic secondary amines which can be utilized include pyrrolidine, 2-methylpyrrolidine, 2-ethylpyrrolidine, 2-isopropylpyrrolidine, 3-butylpyrrolidine, 2-sec-butylpyrrolidine, 2,2-dimethylpyrrolidine, 3,4-dimethylpyrrolidine, 2,3,5-trimethylpyrrolidine, piperidine, 2-methylpiperidine, 3-methylpiperidine, 4-methylpiperidine, 2-propylpiperidine, 4-isopropylpiperidine, 2-butylpiperidine, 4-tert-butylpiperidine, 2-methyl-5-ethylpiperidine, 3,4-diethylpiperidine, 2,4,6-trimethylpiperidine, hexamethylenimine, 2-methylhexamethylenimine, 3,6 - dimethylhexamethylenimine, 2,2-dibutylhexamethylenimine, heptamethylenimine, 2-methylheptamethylenimine, octamethylenimine, 3-methyloctamethylenimine, morpholine, 2-ethylmorpholine, 2-ethyl-5-methylmorpholine, 3,3-dimethylmorpholine, 4-methylpiperazine, 4-isopropylpiperazine, 4-butylpiperazine, 2,4,5-trimethylpiperazine, and the like.

The starting Formula II alkyl (4-phenoxy-3,5-dihalophenyl)-alkanoates can be prepared by procedures well known in the art. It is pointed out that in some instances, depending on the particular procedure used, the initially obtained compound is not a Formula II alkyl (4-phenoxy-3,5-dihalophenyl)alkanoate but instead is the (4-phenoxy-3,5-dihalophenyl)alkanoic acid corresponding thereto. In such instances, the latter can be converted to the desired Formula II alkyl ester as more fully described below.

For example, Kharasch et al., J. Org. Chem. 21, 925, 929 (1959), disclose a procedure for the preparation of representative propionic and butyric acid derivatives. Meltzer et al., J. Org. Chem. 22, 1577 (1957), disclose a process for the preparation of representative acetic and benzoic acid derivatives.

In the processes disclosed by Kharasch et al. and Meltzer et al., the acetic acid, propionic acid, butyric acid, and benzoic acid derivatives are prepared by condensing a 4-alkoxyphenol with an alkyl (4-mesyloxy-3,5-dinitrophenyl)alkanoate or an alkyl (4-tosyloxy-3,5-dinitrophenyl)alkanoate to obtain an alkyl [4-(4-alkoxyphenoxy)-3,5-dinitrophenyl]alkanoate, reducing the nitro groups of the latter to amino, replacing the amino groups with halogen via the diazonium compound and Sandmeyer reaction, and hydrolyzing the resulting alkyl [4-(4-alkoxyphenoxy)-3,5-dihalophenyl]alkanoate to obtain the corresponding [4-(4-alkoxyphenoxy)-3,5 - dihalophenyl] alkanoic acid. Alternatively, the alkyl [4-(4-alkoxyphenoxy)-3,5-dihalophenyl]alkanoate can be dealkylated and deesterified by heating with a mixture of acetic acid and hydriodic acid or hydrobromic acid to obtain the corresponding [4-(4-hydroxyphenoxy)-3,5-dihalophenyl] alkanoic acid. The [4-(4-alkoxyphenoxy)-3,5-dihalophenyl]alkanoic acids and [4-(4-hydroxyphenoxy)-3,5-dihalophenyl]alkanoic acid corresponding to the alkyl esters of Formula II in which $R_1$ or $R_2$, or both, are hydrogen, can be halogenated and then esterified to obtain the corresponding alkyl esters of Formula II in which $R_1$ or $R_2$, or both, are halogen. Such halogenation can be accomplished by procedures known in the art, e.g., Meltzer et al., supra; Clayton et al., J. Chem. Soc. 2467 (1961); Harington et al., Biochem. J. 50, 438 (1952); and Dibbo et al., J. Chem. Soc. 2890 (1961).

Substituted 4-alkoxyphenols can be prepared by the Elbs reaction [J. Chem. Soc. 2303 (1948)]. Representative 4-alkoxyphenols which can be utilized include 4-methoxyphenol, 4-ethoxyphenol, 4-propoxyphenol, 4-butoxyphenol, 4-isobutoxyphenol, 3-methyl-4-methoxyphenol, 2-methyl-4-methoxyphenol, 3-methyl-4-propoxyphenol, 2,5-dimethyl-4-methoxyphenol, 2,3-dimethyl-4-methoxyphenol, 2-methyl-4-methoxyphenol, 2,3-dimethyl-4-butoxyphenol, 2-isopropyl-5-methyl-4 - methoxyphenol, 2,3,5-trimethyl-4-methoxyphenol, 2,3,5-trimethyl - 4 - propoxyphenol, 2,3,5,6-tetramethyl-4-methoxyphenol, 2,3,5,6-tetramethyl-4-propoxyphenol, 3,5-dimethyl - 4 - methoxyphenol, 3,5-diethyl-4 - methoxyphenol, 3,5 - dibromo - 4-methoxyphenol, 3,5-dichloro-4-methoxyphenol, and the like.

Another useful process for the preparation of representative acetic acid derivatives is disclosed in British Patent 882,401, wherein a nitro oxazolone derivative is reacted with a mixture of acetic and hydrohalic acids to form the corresponding nitro pyruvic acid derivative, the latter is decomposed with hydrogen peroxide in alkaline solution to form the corresponding nitro acetic acid derivative, the nitro group of the latter is reduced to an amino group, and the amino group is replaced with halogen via the diazonium compound and Sandmeyer reaction.

Still other processes for the preparation of the alkanoic acids are disclosed by Ziegler et al., J. Org. Chem. 27, 3335 (1962); Dibbo et al., supra; Dibbo et al., J. Chem. Soc. 2645 (1961); and German Patent 1,078,582.

As has been pointed out above, in some instances, in accordance with procedures such as those set forth above for the preparation of (4-phenoxy-3,5-dihalophenyl) alkanoic acids and Formula II alkyl (4-phenoxy-3,5-dihalophenyl)alkanoates, the compound initially obtained is a free acid. The latter can then be converted to an alkyl ester, for example, by esterification with an alkanol such as methanol, ethanol, 1-propanol, 2-propanol, 1-butanol, 1-pentanol, 4-methyl-1-pentanol, 3-methyl-1-butanol, 1-heptanol, 1-octanol, and the like, in the presence of an acid catalyst such as hydrogen chloride, sulfuric acid, p-toluene-sulfonic acid, and the like. In other instances, the desired Formula II alkyl ester, rather than the free acid, is obtained initially.

Representative alkyl (4-phenoxy-3,5-dihalophenyl)alkanoates of Formula II which can be utilized in the process of this invention include methyl, ethyl, propyl, butyl, pentyl, hexyl, heptyl, octyl, and like alkyl 3-[3,5-diiodo-4-(4-hydroxyphenoxy)pheny 1] propionates,
3,5-diiodo-4-(4-hydroxyphenoxy)phenylacetates,
4-[3,5-diiodo-4-(4-methoxyphenoxy)phenyl]butyrates,
4-[3,5-diiodo-4-(3,5-dimethyl-4-hydroxyphenoxy) phenyl]butyrates,
3,5-diiodo-4-(3,5-dimethyl-4-hydroxyphenoxy) phenylacetates,
3-5-diiodo-4-(4-methoxy-phenoxy)phenylacetates,
3,5-diiodo-4-(3-methyl-4-methoxyphenoxy) phenylacetates,
3-[3,5-diiodo-4-(2-methyl-4-hydroxyphenoxy)phenyl] propionates,
3-[3,5-diiodo-4-(2-methyl-4-methoxyphenoxy)phenyl] propionates,
4-[3,5-diiodo-4-(3,5-diiodo-4-hydroxyphenoxy)phenyl] butyrates,
4-[3,5-diiodo-4-(3-iodo-4-hydroxyphenoxy)phenyl] butyrates,
3-[3,5-diiodo-4-(3,5-diiodo-4-hydroxyphenoxy)phenyl] propionates,
3-[3,5-diiodo-4-(3-iodo-4-hydroxyphenoxy)phenyl]
3-[3,5-diiodo-4-(3,5-diiodo-4-isobutoxyphenoxy)phenyl] propionates,
3-[3,5-diiodo-4-(3,5-diiodo-4-ethoxyphenoxy)phenyl] propionates,
3-[3,5-diiodo-4-(3,5-dimethyl-4-hydroxyphenoxy) phenyl]propionates,
3-[3,5-diiodo-4-(2-methyl-5-iodo-4-hydroxyphenoxy) phenyl]propionates,
3,5-diiodo-4-(3,5-diiodo-4-hydroxyphenoxy)phenyl- acetates,
3,5-diiodo-4-(3-iodo-4-hydroxyphenoxy)phenylacetates,
3,5-diiodo-4-(3-iodo-4-methoxyphenoxy)phenylacetates,
3,5-diiodo-4-(3,5-diiodo-4-hydroxyphenoxy)benzoates,
3,5-diiodo-4-(3-iodo-4-hydroxyphenoxy)benzoates,
3,5-diiodo-4-(4-hydroxyphenoxy)benzoates,
3,5-diiodo-4-(4-methoxyphenoxy)benzoates,
3,5-dibromo-4-(3,5-dimethyl-4-methoxyphenoxy) phenylacetates,
3,5-dibromo-4-(4-hydroxyphenoxy)phenylacetates,
3,5-dibromo-4-(4-methoxyphenoxy)phenylacetates,
3,5-dibromo-4-(3-bromo-4-hydroxyphenoxy) phenylacetates,
3,5-dibromo-4-(3,5-dibromo-4-hydroxyphenoxy) phenylacetates,
3,5-dichloro-4-(4-hydroxyphenoxy)phenylacetates,
3,5-dichloro-4-(4-methoxyphenoxy)phenylacetates,
3,5-dichloro-4-(3-chloro-4-hydroxyphenoxy) phenylacetates,
3,5-dichloro-4-(3,5-dichloro-4-hydroxyphenoxy) phenylacetates,
3,5-dichloro-4-(4-hydroxyphenoxy)benzoates,
3,5-dichloro-4-(3-chloro-4-hydroxyphenoxy)benzoates,
4-[3,5-dichloro-4-(2-isopropyl-5-methyl-4-methoxy- phenoxy)phenyl]butyrates, 3-[3,5-dibromo-4-(2,5-diethyl-4-methoxyphenoxy)
phenyl]propionates,
3,5-dibromo-4-(2,3-dimethyl-4-butoxyphenoxy)
benzoates,
3,5-dibromo-4-(3-chloro-4-hydroxyphenoxy)
phenylacetates,
3,5-dibromo-4-(3,5-dimethyl-4-hydroxyphenoxy)
phenylacetates,
3,5-dichloro-4-(3,5-dimethyl-4-methoxyphenoxy)
phenylacetates,
3,5-dichloro-4-(3,5-dimethyl-4-hydroxyphenoxy)
phenylacetates,
3-[3-bromo-5-iodo-4-(4-hydroxyphenoxy)phenyl]
propionates, and the like.

In general, the lower alkyl esters are preferred, for example, the methyl, ethyl, propyl, isopropyl, and butyl esters.

The following examples are illustrative of the products of the present invention but are not to be construed as limiting.

EXAMPLE 1

2-[3,5-diiodo-4-(3-5-dimethyl-4-methoxyphenoxy)
phenyl]-N,N-dimethylacetamide

Methyl 3,5-diiodo-4-(3,5-dimethyl-4-methoxyphenoxyl) phenylacetate (1.0 g.) was suspended in 50 ml. of methanol and 40 ml. of anhydrous dimethylamine in a Carius tube. The tube was sealed and heated on a steam bath for about 16 hours. The tube was opened and excess dimethylamine was removed by distillation. The resulting methanol solution was treated with decolorizing charcoal, filtered, and concentrated to a small volume, whereupon 1.2 g. (moist weight) of 2-[3,5-diiodo-4-(3,5-dimethyl-4-methoxyphenoxy)phenyl] - N,N-dimethylacetamide crystallized as a cluster of white needles; melting point of the dried compound, 171–172.5° C. The melting point remained unchanged on recrystallization from methanol.

*Analysis.*—Calcd. for $C_{19}H_{21}I_2NO_3$ percent: C, 40.37; H, 3.75; I, 44.91; N, 2.48. Found: C, 40.27; H, 3.75; I, 45.61; N, 2.55. U.V. (ethanol) 224 m$\mu$ ($\epsilon$=38,450); 272m$\mu$ ($\epsilon$=12,750). I.R.(principal bands; mineral oil mull) 1630, 1540, 1480 cm.

In the same manner as shown in Example 1, 2-[3,5-diiodo - 4 - (3,5 - dimethyl-4-methoxyphenoxy)phenyl]-N,N-dimethylacetamide was obtained by substituting ethyl, propyl, isopropyl, butyl, isohexyl, and octyl 3,5-diiodo - 4 - (3,5-dimethyl-4-methoxyphenoxy)phenylacetate, respectively, for methyl 3,5-diiodo-4-(3,5-dimethyl-4-methoxyphenoxy)phenylacetate.

In the same manner as shown in Example 1, but substituting ammonia, methylamine, ethylamine, diethylamine, pyrrolidine, piperidine, hexamethylenimine, and morpholine for dimethylamine, the following compounds were obtained: 2-[3,5-diiodo-4-3,5-dimethyl-4-methoxyphenoxy)phenyl]acetamide, 2-[3,5-diiodo-4-(3,5-dimethyl-4-methoxyphenoxy)phenyl] - N - methylacetamide, 2-[3,5-diiodo-4 - (3,5-dimethyl-4-methoxyphenoxy)phenyl]-N-ethylacetamide, 2-[3,5-diiodo-4-(3,5-dimethyl - 4 - methoxyphenoxy)phenyl]-N,N-diethylacetamide, 1 - [3,5-diiodo-4-(3,5 - dimethyl-4-methoxyphenoxy)phenylacetyl] pyrrolidine, 1-[3,5-diiodo-4-(3,5-dimethyl-4-methoxyphenoxy)phenylacetyl] piperdine, 1-[3,5 - diiodo - 4 - (3,5-dimethyl - 4 - methoxyphenoxy)phenyl-acetyl]hexamethylenimine, and 4-[3,5-diiodo-4-(3,5-dimethyl-4-methoxyphenoxy)phenylacetyl]morpholine, respectively.

EXAMPLE 2

2-[3,5-dibromo-4-(3,5-dimethyl-4-methoxyphenoxy)
phenyl]-N,N-dimethylacetamide

Following the procedure of Example 1, but substituting methyl 3,5-dibromo-4-(3,5-dimethyl-4-methoxyphenoxy)phenylacetate for methyl 3,5 - diiodo - 4 - (3,5-dimethyl - 4 - methoxyphenoxy)phenylacetate, there was obtained 2-[3,5 - dibromo-4-(3,5-dimethyl-4-methoxyphenoxy)phenyl] - N,N - dimethylacetamide, which after recrystallization from methanol melted between 131–131.5° C.

*Analysis.*—Calcd. for $C_{19}H_{21}Br_2NO_3$ percent: C, 48.43; H, 4.49; Br, 33.92; N, 2.97. Found: C, 48,57; H, 4.66; Br, 34.03; N, 3.13. U.V.(ethanol) 208 m$\mu$ ($\epsilon$=78,750); 276 m$\mu$ ($\epsilon$=2300); sh. 283 m$\mu$ ($\epsilon$=2150). I.R.(principal bands; mineral oil mull) 1640, 1605, 1555, 1485 cm.$^{-1}$ In the same manner as shown in Example 2, but substituting ammonia, methylamine, ethylamine, diethylamine, pyrrolidine, piperidine, hexamethylenimine, and morpholine for dimethylamine, the following compounds were obtained: 2-[3,5-dibromo-4-(3,5-dimethyl-4-methoxy)phenyl]acetamide, 2 - [3,5-dibromo-4-(3,5-dimethyl-4-methoxyphenoxy)phenyl] - N-methylacetamide, 2-[3,5 - dibromo - 4 - (3,5-dimethyl-4-methoxyphenoxy) phenyl]-N-ethylacetamide, 2-[3,5-dibromo-4-(3,5-dimethyl-4-methoxyphenoxy)phenyl] - N,N - diethylacetamide, 1 - [3,5 - dibromo - 4 - (3,5-dimethyl-4-methoxyphenoxy) phenylacetyl]pyrrolidine, 1 - [3,5-dibromo-4-(3,5-dimethyl-4-methoxyphenoxy)phenylacetyl]piperidine, 1 - [3,5-dibromo - 4 - (3,5-dimethyl-4-methoxyphenoxy)phenylacetyl]hexamethylenimine, and 4 - [3,5-dibromo-4-(3,5-dimethyl - 4 - methoxyphenoxy)phenylacetyl]morpholine respectively.

EXAMPLE 3

2 - [3,5 - diiodo - 4 - (3,5-dimethyl-4-hydroxyphenoxy)
phenyl]-N-ethylacetamide In the same manner as shown in Example 1, 2-[3,5- diiodo - 4-(3,5 - dimethyl-4-hydroxyphenoxy)phenyl]-N-ethylacetamide was prepared by substituting methyl 3,5-diiodo-4-(3,5-dimethyl-4-hydroxyphenoxy)phenylacetate for methyl 3,5 - diiodo - 4-(3,5-dimethyl-4-methoxyphenoxy) phenylacetate, and ethylamine for dimethylamine.

EXAMPLE 4

4 - [3,5 - diiodo - 4 - (3,5 - diiodo - 4 - hydroxyphenoxy)
phenyl]-N-propylbutyramide In the same manner as shown in Example 1, 4-(3,5-diiodo - 4 - (3,5 - diiodo - 4 - hydroxyphenoxy)phenyl]-N-propylbutyramide was prepared by substituting methyl 4 - [3,5 - diiodo - 4 - (3,5 - diiodo - 4 - hydroxyphenoxy) phenyl]butyrate for methyl 3,5-diiodo-4-(3,5-dimethyl-4-methoxyphenoxy)phenylacetate, and propylamine for dimethylamine.

EXAMPLE 5

3 - [3,5 - diiodo - 4 - (3 - iodo - 4 - hydroxyphenoxy)
phenyl]-N-butylpropionamide In the same manner as shown in Example 1, 3-[3,5-diiodo - 4 - (3 - iodo - 4 - hydroxyphenoxy)phenyl]-N-butylpropionamide was prepared by substituting methyl 3 - [3,5 - diiodo - 4 - (3 - iodo - 4 - hydroxyphenoxy) phenyl]propionate for methyl 3,5-diiodo-4-(3,5-dimethyl-4-methoxyphenoxy)phenylacetate, and butylamine for dimethylamine.

EXAMPLE 6

2 - [3,5 - diiodo - 4 - (4 - hydroxyphenoxy)phenyl]-N,N-
diisopropylacetamide

In the same manner as shown in Example 1, 2-[3,5-diiodo - 4 - (4 - hydroxyphenoxy)phenyl] - N,N - diisopropylacetamide was prepared by substituting methyl 3,5-diiodo - 4 - (4 - hydroxyphenoxy)phenylacetate for methyl 3,5-diiodo-4-(3,5-dimethyl-4-methoxyphenoxy)phenylacetate, and diisopropylamine for dimethylamine.

EXAMPLE 7

2 - [3,5 - diiodo - 4 - (3 - iodo - 4 - hydroxyphenoxy)
phenyl]-N,N-diisobutylacetamide In the same manner as shown in Example 1, 2-[3,5-diiodo - 4 - (3 - iodo - 4 - hydroxyphenoxy)phenyl] - N,N-diisobutylacetamide was prepared by substituting methyl 3,5 - diiodo - 4 - (3 - iodo-4-hydroxyphenoxy)phenylacetate for methyl 3,5-diiodo-4-(3,5-dimethyl-4-methoxyphenoxy)phenylacetate, and diisobutylamine for dimethylamine.

EXAMPLE 8

3 - [3,5 - diiodo - 4 - (4 - hydroxyphenoxy)phenyl] - N - methyl-N-ethylpropionamide In the same manner as shown in Example 1, 3-[3,5-diiodo - 4 - (4 - hydroxyphenoxy)phenyl] - N - methyl - N-ethylpropionamide was prepared by substituting methyl 3 - [3,5 - diiodo - 4 - (4 - hydroxyphenoxy)phenyl] propionate for methyl 3,5-diiodo-4-(3,5-dimethyl-4-methoxyphenoxy)phenylacetate, and N-methylethylamine for dimethylamine.

EXAMPLE 9

1 - {4 - [3,5 - diiodo - 4 - (4 - methoxyphenoxy)phenyl]butyryl}pyrrolidine

In the same manner as shown in Example 1, 1-{4-[3,5-diiodo - 4 - (4 - methoxyphenoxy)phenyl]butyryl}pyrrolidine was prepared by substituting methyl 4-[3,5-diiodo - 4 - (4 - methoxyphenoxy)phenyl]butyrate for methyl 3,5 - diiodo-4-(3,5-dimethyl-4-methoxyphenoxy)phenylacetate, and pyrrolidine for dimethylamine.

EXAMPLE 10

1 - {3 - [3,5 - diiodo - 4 - (3,5 - diiodo - 4 - isobutoxyphenoxy)phenyl]propionyl}-2-ethylpyrrolidine In the same manner as shown in Example 1, 1-{3-[3,5-diiodo - 4 - (3,5 - diiodo - 4 - isobutoxyphenoxy)phenyl] propionyl}-2-ethylpyrrolidine was prepared by substituting methyl 3 - [3,5-diiodo-4-(3,5-diiodo-4-isobutoxyphenoxy)phenyl]propionate for methyl 3,5-diiodo-4-(3,5-dimethyl-4-methoxyphenoxy)phenylacetate, and 2 - ethylpyrrolidine for dimethylamine.

EXAMPLE 11

1 - {3 - [3,5 - diiodo - 4 - (3,5 - diiodo - 4 - ethoxyphenoxy)phenyl]propionyl}-2-isopropylpyrrolidine In the same manner as shown in Example 1, 1-{3-[3,5-diiodo - 4 - (3,5 - diiodo - 4 - ethoxyphenoxy)phenyl] propionyl}-2-isopropylpyrrolidine was prepared by substituting methyl 3 - [3,5 - diiodo - 4 - (3,5 - diiodo - 4 - ethoxyphenoxy)phenyl]propionate for methyl 3,5-diiodo-4 - (3,5 - dimethyl - 4 -methoxyphenoxy)phenylacetate, and 2-isopropylpyrrolidine for dimethylamine.

EXAMPLE 12

1 - {3 - [3,5 - diiodo - 4 - (3,5 - dimethyl - 4 - hydroxyphenoxy)phenyl]propionyl}-3-butylpyrrolidine In the same manner as shown in Example 1, 1-{3-[3,5-diiodo - 4 - (3,5 - dimethyl - 4 - hydroxyphenoxy)phenyl] propionyl}-3-butylpyrrolidine was prepared by substituting methyl 3-[3,5-diiodo-4-(3,5-dimethyl-4-hydroxyphenoxy)phenyl]propionate for methyl 3,5-diiodo-4-(3,5-dimethyl-4-methoxyphenoxy)phenylacetate, and 3 - butylpyrrolidine for dimethylamine.

EXAMPLE 13

1 - {4 - [3,5 - diiodo - 4 - (3,5 - dimethyl - 4 - hydroxyphenoxy)phenyl]butyryl}-2-sec-butylpyrrolidine In the same manner as shown in Example 1, 1-{4-[3,5-diiodo - 4 - (3,5 - dimethyl - 4 - hydroxyphenoxy)phenyl] butyryl}-2-sec-butylpyrrolidine was prepared by substituting methyl 4 - [3,5 - diiodo - 4 - (3,5 - dimethyl - 4 - hydroxyphenoxy)phenyl]butyrate for methyl 3,5-diiodo-4-(3,5-dimethyl-4-methoxyphenoxy)phenylacetate, and 2-sec-butylpyrrolidine for dimethylamine.

EXAMPLE 14

1 - {4 - [3,5 - diiodo - 4 - (4 - hydroxyphenoxy)phenyl]butyryl}-3,4-dimethylpyrrolidine In the same manner as shown in Example 1, 1-{4-[3,5-diiodo - 4 - (4 - hydroxyphenoxy)phenyl]butyryl} - 3,4-dimethylpyrrolidine was prepared by substituting methyl 4 - [3,5 - diiodo - 4 - (4 - hydroxyphenoxy)phenyl]butyrate for methyl 3,5-diiodo-4-(3,5-dimethyl-4-methoxyphenoxy)phenylacetate, and 3,4-dimethylpyrrolidine for dimethylamine.

EXAMPLE 15

1 - [3,5 - diiodo - 4 - (4 - methoxyphenoxy)phenylacetyl]-2,3,5-trimethylpyrrolidine In the same manner as shown in Example 1, 1-[3,5-diiodo - 4 - (4 - methoxyphenoxy)phenylacetyl] - 2,3,5-trimethylpyrrolidine was prepared by substituting methyl 3,5 - diiodo - 4 - (4 - methoxyphenoxy)phenylacetate for methyl 3,5 - diiodo - 4 - (3,5 - dimethyl - 4 - methoxyphenoxy)phenylacetate, and 2,3,5-trimethylpyrrolidine for dimethylamine.

EXAMPLE 16

1 - {3 - [3,5 - diiodo - 4 - (2 - methyl - 4 - hydroxyphenoxy)phenyl]propionyl}piperidine In the same manner as shown in Example 1, 1-{3-[3,5-diiodo - 4 - (2 - methyl - 4 - hydroxyphenoxy)phenyl] propionyl}piperidine was prepared by substituting methyl 3 - [3,5 - diiodo - 4 - (2 - methyl - 4 - hydroxyphenoxy)phenyl]propionate for methyl 3,5-diiodo-4-(3,5-dimethyl-4-methoxyphenoxy)phenylacetate, and piperidine for dimethylamine.

EXAMPLE 17

1-{3-[3,5-diiodo-4-(2-methyl-4-methoxyphenoxy)phenyl]propionyl}-4-methylpiperidine In the same manner as shown in Example 1, 1-{3-[3,5-diiodo - 4 - (2 - methyl - 4 - methoxyphenoxy)phenyl] propionyl}-4-methylpiperidine was prepared by substituting methyl 3 - [3,5 - diiodo - 4 - (2 - methyl - 4 - methoxyphenoxy)phenyl]propionate for methyl 3,5-diiodo-4-(3,5 - dimethyl - 4 - methoxyphenoxy)phenylacetate, and 4-methylpiperidine for dimethylamine.

EXAMPLE 18

1-{4-[3,5-diiodo-4-(3-iodo-4-hydroxyphenoxy)phenyl]butyryl}-2-propylpiperidine

In the same manner as shown in Example 1, 1-{4-[3,5-diiodo - 4 - (3 - iodo - 4 - hydroxyphenoxy)phenyl] butyryl} - 2 - propylpiperidine was prepared by substituting methyl 4-[3,5-diiodo-4-(3-iodo-4-hydroxyphenoxy)phenyl]butyrate for methyl 3,5-diiodo-4-(3,5-dimethyl-4-methoxyphenoxy)phenylacetate, and 2 - propylpiperidine for dimethylamine.

EXAMPLE 19

1-{3-[3,5-diiodo-4-(3,5-diiodo-4-hydroxyphenoxy)phenyl]propionyl}-4-isopropylpiperidine In the same manner as shown in Example 1, 1-{3-[3,5-diiodo - 4 - (3,5 - diiodo - 4 - hydroxyphenoxy)phenyl] propionyl}-4-isopropylpiperidine was prepared by substituting methyl 3 - [3,5 - diiodo - 4 - (3,5 - diiodo - 4 - hydroxyphenoxy)phenyl]propionate for methyl 3,5-diiodo-4 - (3,5 -dimethyl - 4 - methoxyphenoxy)phenylacetate, and 4-isopropylpiperidine for dimethylamine.

EXAMPLE 20

1-{3-[3,5-diiodo-4-(3,5-diiodo-4-methoxyphenoxy)phenyl]propionyl}-2-butylpiperidine In the same manner as shown in Example 1, 1-{3-[3,5-diiodo - 4 - (3,5 - diiodo - 4 - methoxyphenoxy)phenyl] propionyl} - 2 - butylpiperidine was prepared by substituting methyl 3 - [3,5 - diiodo - 4 - (3,5 - diiodo - 4 - methoxyphenoxy)phenyl]propionate for methyl 3,5diiodo-4 - (3,5 - dimethyl - 4 - methoxyphenoxy)phenylacetate, and 2-butylpiperidine for dimethylamine.

EXAMPLE 21

1-{3-[3,5-diiodo-4-(3-iodo-4-methoxyphenoxy)phenyl]propionyl}-4-tert-butylpiperidine In the same manner as shown in Example 1, 1-{3-[3,5-diiodo - 4 - (3 - iodo - 4 - methoxyphenoxy)phenyl]propionyl}-4-tert-butylpiperidine was prepared by substituting methyl 3-[3,5-diiodo-4-(3-iodo-4-methoxyphenoxy)phenyl]propionate for methyl 3,5-diiodo-4-(3,5-dimethyl - 4 - methoxyphenoxy)phenylacetate, and 4 - tert - butylpiperidine for dimethylamine.

EXAMPLE 22

1-[3,5-diiodo-4-(3,5-diiodo-4-hydroxyphenoxy)benzoyl]-2-methyl-5-ethylpiperidine In the same manner as shown in Example 1, 1-[3,5-diiodo - 4 - (3,5 - diiodo - 4 - hydroxyphenoxy)benzoyl]-2 - methyl - 5 - ethylpiperidine was prepared by substituting methyl 3,5 - diiodo - 4 - (3,5 - diiodo - 4 - hydroxyphenoxy)benzoate for methyl 3,5 - diiodo - 4 - (3,5 - dimethyl - 4 - methoxyphenoxy)phenylacetate, and 2-methyl-5-ethylpiperidine for dimethylamine.

EXAMPLE 23

1-[3,5-diiodo-4-(3-iodo-4-methoxyphenoxy)phenylacetyl]-3,4-diethylpiperidine

In the same manner as shown in Example 1, 1-[3,5-diiodo - 4 - (3 - iodo - 4 - methoxyphenoxy)phenylacetyl] - 3,4 - diethylpiperidine was prepared by substituting methyl 3,5 - diiodo - 4 - (3 - iodo - 4 - methoxyphenoxy)phenylacetate for methyl 3,5 - diiodo - 4 - (3,5 - dimethyl - 4 - methoxyphenoxy)phenylacetate, and 3,4 - diethylpiperidine for dimethylamine.

EXAMPLE 24

1-[3,5-diiodo-4-(2,3,5,6-tetraethyl-4-propoxyphenoxy)phenylacetyl]-2,4,6-trimethylpiperidine In the same manner as shown in Example 1, 1-[3,5-diiodo - 4 - (2,3,5,6 - tetraethyl - 4 - propoxyphenoxy)phenylacetyl] - 2,4,6 - trimethylpiperidine was prepared by substituting methyl 3,5 - diiodo - 4 - (2,3,5,6 - tetraethyl - 4 -propoxyphenoxy)phenylacetate for methyl 3,5-diiodo - 4 - (3,5 - dimethyl - 4 - methoxyphenoxy)phenylacetate, and 2,4,6 - trimethylpiperidine for dimethylamine.

EXAMPLE 25

1-{3-[3,5-diiodo-4-(2,3,5,6-tetrapropyl-4-butoxyphenoxy)phenyl]propionyl}-2-methylhexamethylenimine In the same manner as shown in Example 1, 1-{3-[3,5-diiodo - 4 - (2,3,5,6 - tetrapropyl - 4 - butoxyphenoxy)phenyl]propionyl} - 2 - methylhexamethylenimine was prepared by substituting methyl 3 - [3,5 - diiodo - 4- (2,3,5,6 - tetrapropyl - 4 - butoxyphenoxy)phenyl]propionate for methyl 3,5 - diiodo - 4 - (3,5 - dimethyl - 4-methoxyphenoxy)phenylacetate, and 2-methylhexamethylenimine for dimethylamine.

EXAMPLE 26

1-{4-[3,5-diiodo-4-(2,3,5,6-tetrabutyl-4-hydroxyphenoxy)phenyl]butyryl}-3,6-dimethylhexamethylenimine In the same manner as shown in Example 1, 1-{4-[3,5-diiodo - 4 - (2,3,5,6 - tetrabutyl - 4 - hydroxyphenoxy)phenyl]butyryl} - 3,6 - dimethylhexamethylenimine was prepared by substituting methyl 4 - [3,5 - diiodo - 4- (2,3,5,6 - tetrabutyl - 4 - hydroxyphenoxy)phenyl]butyrate for methyl 3,5 - diiodo - 4 - (3,5 - dimethyl - 4-methoxyphenoxy)phenylacetate, and 3,6 - dimethylhexamethylenimine for dimethylamine.

EXAMPLE 27

1-[3,5-diiodo-4-(3,5-dichloro-4-hydroxyphenoxy)phenylacetyl]-2,2-dibutylhexamethylenimine In the same manner as shown in Example 1, 1-[3,5-diiodo - 4 - (3,5 - dichloro - 4 - hydroxyphenoxy)phenylacetyl] - 2,2 - dibutylhexamethylenimine was prepared by substituting methyl 3,5 - diiodo - 4 - (3,5 - dichloro - 4- hydroxyphenoxy)phenylacetate for methyl 3,5 - diiodo-4 - (3,5 - dimethyl - 4 - methoxyphenoxy)phenylacetate, and 2,2-dibutylhexamethylenimine for dimethylamine.

EXAMPLE 28

1-{3-[3,5-diiodo-4-(3,5-difluoro-4-hydroxyphenoxy)phenyl]propionyl}heptamethylenimine In the same manner as shown in Example 1, 1-{3-[3,5-diiodo - 4 - (3,5 - difluoro - 4 - hydroxyphenoxy)phenyl]propionyl}heptamethylenimine was prepared by substituting methyl 3 - [3,5 - diiodo - 4 - (3,5 - difluoro - 4-hydroxyphenoxy)phenyl]propionate for methyl 3,5 - diiodo - 4 - (3,5 - dimethyl - 4 - methoxyphenoxy)phenylacetate, and heptamethylenimine for dimethylamine.

EXAMPLE 29

1-{4-[3,5-diiodo-4-(3,5-dibromo-4-hydroxyphenoxy)phenyl]butyryl}-3-methyloctamethylenimine In the same manner as shown in Example 1, 1-{4-[3,5-diiodo - 4 - (3,5 - dibromo - 4 - hydroxyphenoxy)phenyl]butyryl} - 3 - methyloctamethylenimine was prepared by substituting methyl 4 - [3,5 - diiodo - 4 - (3,5 - dibromo - 4 - hydroxyphenoxy)phenyl]butyrate for methyl 3,5 - diiodo - 4 - (3,5 - dimethyl - 4 - methoxyphenoxy)phenylacetate, and 3 - methyloctamethylenimine for dimethylamine.

EXAMPLE 30

4-[3,5-diiodo-4-(3-iodo-4-hydroxyphenoxy)benzoyl]-2-ethylmorpholine

In the same manner as shown in Example 1, 4-[3,5-diiodo - 4 -(3 - iodo - 4 - hydroxyphenoxy)benzoyl] - 2-ethylmorpholine was prepared by substituting methyl 3,5 - diiodo - 4 - (3 - iodo - 4 - hydroxyphenoxy)benzoate for methyl 3,5 - diiodo - 4 - (3,5 - dimethyl - 4 - methoxyphenoxy)phenylacetate, and 2-ethylmorpholine for dimethylamine.

EXAMPLE 31

4-[3,5-diiodo-4-(4-hydroxyphenoxy)benzoyl]-2-ethyl-5-methylmorpholine

In the same manner as shown in Example 1, 4-[3,5-diiodo-4-(4-hydroxyphenoxy)benzoyl]-2-ethyl - 5 - methylmorpholine was prepared by substituting methyl 3,5-diiodo-4-(4-hydroxyphenoxy)benzoate for methyl 3,5-diiodo-4-(3,5 - dimethyl-4-methoxyphenoxy)phenylacetate, and 2-ethyl-5-methylmorpholine for dimethylamine.

EXAMPLE 32

4-[3,5-diiodo-4-(4-methoxyphenoxy)benzoyl]-3,3-dimethylmorpholine

In the same manner as shown in Example 1, 4-[3,5-diiodo-4-(4-methoxyphenoxy)benzoyl] - 3,3 - dimethylmorpholine was prepared by substituting methyl 3,5-diiodo-4-(4-methoxyphenoxy)benzoate for methyl 3,5-diiodo-4-(3,5-dimethyl-4-methoxyphenoxy)phenylacetate, and 3,3-dimethylmorpholine for dimethylamine.

EXAMPLE 33

1-[3,5-diiodo-4-(3,5-diiodo-4-hydroxyphenoxy)benzoyl]-4-butylpiperazine

In the same manner as shown in Example 1, 1-[3,5-diiodo-4-(3,5 - diiodo - 4 - hydroxyphenoxy)benzoyl]-4-butylpiperazine was prepared by substituting methyl 3,5-diiodo-4-(3,5-diiodo - 4 - hydroxyphenoxy)benzoate for methyl 3,5-diiodo-4-(3,5 - dimethyl-4-methoxyphenoxy)phenylacetate, and 4-butylpiperazine for dimethylamine.

EXAMPLE 34

1-{2-[3,5-diiodo-4-(4-hydroxyphenoxy)phenyl]butyryl}-2,4,5-trimethylpiperazine

In the same manner as shown in Example 1, 1-{2-[3,5-diiodo - 4 - (4-hydroxyphenoxy)phenyl]butyryl}-2,4,5-trimethylpiperazine was prepared by substituting methyl 2-[3,5-diiodo - 4 - hydroxyphenoxy)phenyl]butyrate for methyl 3,5-diiodo-4-(3,5 - dimethyl-4-methoxyphenoxy)phenylacetate, and 2,4,5-trimethylpiperazine for dimethylamine.

EXAMPLE 35

2-[3,5-dibromo-4-(3,5-dimethyl-4-hydroxyphenoxy)phenyl]-N-sec-butylacetamide

In the same manner as shown in Example 1, 2-[3,5-dibromo-4-(3,5-dimethyl - 4 - hydroxyphenoxy)phenyl]-N-sec-butylacetamide was prepared by substituting methyl 3,5-dibromo-4-(3,5-dimethyl - 4 - hydroxhenoxy)phenylacetate for methyl 3,5-diiodo-4-(3,5-dimethyl-4-methoxyphenoxy)phenylacetate, and sec-butylamine for dimethyl-4-methoxyphenoxy)phenylacetate, and sec-butylamine for dimethylamine.

EXAMPLE 36

2-[3,5-diborom-4-(4-hydroxyphenoxy)phenyl]-N-ethyl-N-butylacetamide

In the same manner as shown in Example 1, 2-[3,5-dibromo - 4 - (4-hydroxyphenoxy)phenyl] - N - ethyl-N-butylacetamide was prepared by substituting methyl 3,5-dibromo - 4 - (4-hydroxyphenoxy)phenylacetate for methyl 3,5-diiodo-4-(3,5-dimethyl - 4 - methoxyphenoxy)phenylacetate, and N-ethylbutylamine for dimethylamine.

EXAMPLE 37

1-[3,5-dibromo-4-(4-methoxyphenoxy)phenylacetyl]2-methylpyrrolidine

In the same manner as shown in Example 1, 1-[3,5-dibromo-4-(4 - methoxyphenoxy)phenylacetyl]-2-methylpyrrolidine was prepared by substituting methyl 3,5-dibromo-4-(4-methoxyphenoxy)phenylacetate for methyl 3,5-diiodo-4-(3,5-dimethyl - 4 - methoxyphenoxy)phenylacetate, and 2-methylpyrrolidine for dimethylamine.

EXAMPLE 38

1-[3,5-dibromo-4-(3-bromo-4-hydroxyphenoxy)phenylacetyl]-2-methylpiperidine

In the same manner as shown in Example 1, 1-[3,5-dibromo-4-(3 - bromo-4-hydroxyphenoxy)phenylacetyl]-2-methylpiperidine was prepared by substituting methyl 3,5-dibromo-4-(3 - bromo-4-hydroxyphenoxy)phenylacetate for methyl 3,5-diiodo-4-(3,5-dimethyl - 4 - methoxyphenoxy)phenylacetate, and 2-methylpiperidine for dimethylamine.

EXAMPLE 39

1-[3,5-dibromo-4-(3,5-dibromo-4-hydroxyphenoxy)phenylacetyl]hexamethylenimine

In the same manner as shown in Example 1, 1-[3,5-dibromo-4-(3,5 - dibromo-4-hydroxyphenoxy)phenylacetyl]hexamethylenimine was prepared by substituting methyl 3,5-dibromo - 4 - (3,5-dibromo - 4 - hydroxyphenoxy)phenylacetate for methyl 3,5-diiodo-4-(3,5-dimethyl-4-methoxyphenoxy)phenylacetate, and hexamethylenimine for dimethylamine.

EXAMPLE 40

1-{3-[3,5-dibromo-4-(2,5-diethyl-4-methoxyphenoxy)phenyl]propionyl}-2-methylheptamethylenimine In the same manner as shown in Example 1, 1-{3-[3,5-dibromo-4-(2,5 - diethyl-4-methoxyphenoxy)phenyl]propionyl}-2-methylheptamethylenimine was prepared by substituting methyl 3-[3,5-dibromo - 4 - (2,5-diethyl-4-methoxyphenoxy)phenyl]propionate for methyl 3,5-diiodo-4-(3,5 - dimethyl-4-methoxyphenoxy)phenylacetate, and 2-methylheptamethylenimine for dimethylamine.

EXAMPLE 41

4-[3,5-dibromo-4-(2,3-dimethyl-4-butoxyphenoxy)benzoyl]morpholine

In the same manner as shown in Example 1, 4-[3,5-dibromo-4-(2,3 - dimethyl - 4 - butoxyphenoxy)benzoyl]morpholine was prepared by substituting methyl 3,5-dibromo-4-(2,3-dimethyl - 4 - butoxyphenoxy)benzoate for methyl 3,5-diiodo-4-(3,5-dimethyl - 4 - methoxyphenoxy)phenylacetate, and morpholine for dimethylamine.

EXAMPLE 42

1-[3,5-dibromo-4-(3-chloro-4-hydroxyphenoxy)phenylacetyl]-4-methylpiperazine

In the same manner as shown in Example 1, 1-[3,5-dibromo-4-(3 - chloro-4-hydroxyphenoxy)phenylacetyl]-4-methylpiperazine was prepared by substituting methyl 3,5-dibromo-4-(3 - chloro-4-hydroxyphenoxy)phenylacetate for methyl 3,5-diiodo-4-(3,5-dimethyl-4-methoxyphenoxy)phenylacetate, and 1-methylpiperazine for dimethylamine.

EXAMPLE 43

2-[3,5-dichloro-4-(4-hydroxyphenoxy)phenyl]acetamide

In the same manner as shown in Example 1, 2-[3,5-dichloro - 4 - (4-hydroxyphenoxy)phenyl]acetamide was prepared by substituting methyl 3,5-dichloro-4-(4-hydroxyphenoxy)phenylacetate for methyl 3,5-diiodo-4-(3,5-dimethyl-4-methoxyphenoxy)phenylacetate, and ammonia for dimethylamine.

EXAMPLE 44

2-[3,5-dichloro-4-(4-methoxyphenoxy)phenyl]-N-methylacetamide

In the same manner as shown in Example 1, 2-[3,5-dichloro - 4 - (4-methoxyphenoxy)phenyl]-N-methylacetamide was prepared by substituting methyl 3,5-dichloro-4-(4-methoxyphenoxy)phenylacetate for methyl 3,5-diiodo-4 - (3,5-dimethyl-4-methoxyphenoxy)phenylacetate, and methylamine for dimethylamine.

EXAMPLE 45

2-[3,5-dichloro-4-(3-chloro-4-hydroxyphenoxy)phenyl]-N-isopropylacetamide

In the same manner as shown in Example 1, 2-[3,5-dichloro-4-(3 - chloro-4-hydroxyphenoxy)phenyl]-N-isopropylacetamide was prepared by substituting methyl 3,5-dichloro-4-(3 - chloro-4-hydroxyphenoxy)phenylacetate for methyl 3,5-diiodo-4-(3,5-dimethyl - 4 - methoxyphenoxy)phenylacetate, and isopropylamine for dimethylamine.

EXAMPLE 46

2-[3,5-dichloro-4-(3,5-dichloro-4-hydroxyphenoxy)phenyl]-N,N-diethylacetamide

In the same manner as shown in Example 1, 2-[3,5-dichloro-4-(3,5-dichloro - 4 - hydroxyphenoxy)phenyl]-N,N-diethylacetamide was prepared by substituting methyl 3,5 - dichloro-4-(3,5-dichloro-4-hydroxyphenoxy)phenylacetate for methyl 3,5-diiodo-4-(3,5-dimethyl-4-methoxyphenoxy)phenylacetate, and diethylamine for dimethylamine.

EXAMPLE 47

3,5-dichloro-4-(4-hydroxyphenoxy)-N,N-dibutylbenzamide

In the same manner as shown in Example 1, 3,5-dichloro-4-(4-hydroxyphenoxy)-N,N-dibutylbenzamide was prepared by substituting methyl 3,5-dichloro-4-(4-hydroxyphenoxy)benzoate for methyl 3,5-diiodo-4-(3,5-dimethyl-4-methoxyphenoxy)phenylacetate, and dibutylamine for dimethylamine.

EXAMPLE 48

1-[3,5-dichloro-4-(3-chloro-4-hydroxyphenoxy)benzoyl]-2,2-dimethylpyrrolidine

In the same manner as shown in Example 1, 1-[3,5-dichloro-4-(3-chloro - 4 - hydroxyphenoxy)benzoyl]-2,2-dimethylpyrrolidine was prepared by substituting methyl 3,5-dichloro-4-(3 - chloro-4-hydroxyphenoxy)benzoate for methyl 3,5 - diiodo-4-(3,5-dimethyl-4-methoxyphenoxy)phenylacetate, and 2,2-dimethylpyrrolidine for dimethylamine.

EXAMPLE 49

1-{4-[3,5-dichloro-4-(2-isopropyl-5-methyl-4-methoxyphenoxy)phenyl]butyryl}-3-methylpiperidine In the same manner as shown in Example 1, 1-{4-[3,5-dichloro-4-(2-isopropyl-5-methyl - 4 - methoxyphenoxy)

phenyl]butyryl} - 3 - methylpiperidine was prepared by substituting methyl 4-[3,5-dichloro - 4 - (2-isopropyl-5-methyl-4 - methoxyphenoxy)phenyl]butyrate for methyl 3,5-diiodo-4-(3,5-dimethyl - 4 - methoxyphenoxy)phenylacetate, and 3-methylpiperidine for dimethylamine.

EXAMPLE 50

1-[3,5-dichloro-4-(3,5-dimethyl-4-methoxyphenoxy) phenylacetyl]octamethylenimine In the same manner as shown in Example 1, 1-[3,5-dichloro - 4 - (3,5 - dimethyl - 4-methoxyphenoxy)phenylacetyl]octamethylenimine was prepared by substituting methyl 3,5-dichloro-4-(3,5 - dimethyl-4-methoxyphenoxy) phenylacetate for methyl 3,5-diiodo-4-(3,5 - dimethyl-4-methoxyphenoxy)phenylacetate, and octamethylenimine for dimethylamine.

EXAMPLE 51

1-[3,5-dichloro-4-(3,5-dimethyl-4-hydroxyphenoxy) phenylacetyl]-4-isopropylpiperazine In the same manner as shown in Example 1, 1-[3,5-dichloro-4-(3,5 - dimethyl - 4 - hydroxyphenoxy)phenylacetyl]-4-isopropylpiperazine was prepared by substituting methyl 3,5-dichloro-4-(3,5-dimethyl-4 - hydroxyphenoxy) phenylacetate for methyl 3,5-diiodo - 4-(3,5-dimethyl-4-methoxyphenoxy)phenylacetate, and 1 - isopropylpiperazine for dimethylamine.

EXAMPLE 52

3-[3-bromo-5-iodo-4-(4-hydroxyphenoxy)phenyl] N,N-dimethylpropionamide

In the same manner as shown in Example 1, 3-[3-bromo - 5 - iodo - 4 - (4-hydroxyphenoxy)phenyl]-N,N-dimethylpropionamide was prepared by substituting methyl 3-[3-bromo-5-iodo-4-(4 - hydroxyphenoxy)phenyl]propionate for methyl 3,5-diiodo-4-(3,5-dimethyl-4-methoxyphenoxy)phenylacetate.

It has been found that the compounds of the present invention are capable of significantly reducing the cholesterol content of both blood and tissue by increasing the metabolism and excretion of cholesterol in mammals and animals such as rats and dogs.

The compounds of the present invention are, moreover, particularly useful for the lowering of cholesterol since they are not calorigenic in contrast to other compounds such as L-thyroxine. L-thyroxine has shown some usefulness as a cholesterol lowering agent but unfortunately also increases the metabolic rate, obviously an undesirable reaction. The compounds of the present invention are free of this reaction.

Atherosclerosis is characterized by fatty degeneration occurring in the arterial walls, although the underlying mechanism has not been definitively established. It has been observed, however, that hypercholesteremia is a common finding in animals and mammals with atherosclerosis. Hypercholesteremia refers essentially to an excess of cholesterol in the blood serum. While the causes of hypercholesteremia and the nature of its role in atherosclerosis and related conditions is not clearly understood, considerable effort has been directed toward reducing blood and tissue cholesterol levels as an attack on the clinical conditions in which high levels are implicated. It has long been recognized that certain substances such as sitosterol, corn oil, and nicotinic acid are capable of reducing in small degree the blood and tissue cholesterol contents, either by interfering with the absorption of exogenous cholesterol introduced with food, or by facilitating in some manner the excretion of cholesterol from the body. Major emphasis, however, has been placed on the search for compounds which will interfere with the production of endogenous cholesterol by the liver and hence offer a more positive means for control of cholesterol levels. The dosage of the principal active ingredients in animals and mammals must be determined individually according to the subject's age, weight, response to the medication, severity of the condition being treated, and the route of administration.

In addition to the foregoing compounds as sole active ingredients, other complementary ingredients can be included to secure advantageous combinations of properties specially adapted to individual situations. Such combinations include in each dosage unit conventional therapeutic amounts or less of other hypocholesteremic agents such as 22,25-diazacholestanol, the D-isomer of 3,5,3'-triiodothyronine, and thyroxine-like compounds such as sodium L-thyroxine and sodium D-thyroxine; glucocorticoids such as hydrocortisone, prednisolone, 6α-fluoroprednisolone, and 6α-methylprednisolone; anticoagulants such as heparin, 2-diphenylacetyl-1,3-indandione, polyethylenesulfonate, and dicumarol or its derivatives; vitamins such as nicotinic acid, ascorbic acid, mixed tocopherols, vitamin $B_{12}$, and pyridoxine hydrochloride, estrogens such as estradiol and ethinyl estradiol; androgens such as testosterone, methyltestosterone, and fluoxymesterone; combinations of estrogens and androgens such as estradiol and testosterone; unsaturated fatty acids or esters such as safflower oil, lecithin, corn oil, and linoleic acid or esters; antibiotics such as neomycin, ion-exchange resins such as cholestyramine; analgesics such as aspirin; hypoglycemic agents such as talbutamide; compounds associated with cholesterol synthesis or metabolism such as α-phenylbutyric acid, α-p-biphenylylbutyric acid, and ethyl α-(p-chlorophenoxy)isobutyrate; lipotrophic agents such as choline and inositol; amino acids such as dl-methionine, taurine, and glycine; sterols such as sitosterol and other plant sterols; diuretics such as ethoxzolamide, acetazolamide, and hydrochlorothiazide; anorexigenic agents such as emphetamine; cardiovascular agents (including vasodilators and hypotensive agents) such as chlorisondmine chloride, hexamethodium chloride, and pentaerythritol tetranitrate. In general, the amounts of such supplementary active ingredients incorporated in the unit doses of the compositions hereof should not exceed the normal single dose amounts associated with such agents.

In adapting the active ingredients for use in mammals and birds, the compounds are suitably presented for administration in unit dosage form as tablets, pills, capsules, powders, wafers, cachets, granules, sterile parenteral solutions or suspensions in aqueous or oil vehicles, oral aqueous or oil dispersions, including syrups and elixirs, and the like.

For preparing solid compositions such as tablets, the active ingredient is mixed with a conventional tableting component such as cornstarch, lactose, dicalcium phosphate, talc, stearic acid, calcium stearate, gums, and functionally similar materials constituting pharmaceutical diluents, lubricants, granulating agents, or carriers. The tablets or pills can be laminated or otherwise compounded to provide a dosage form affording the advantage of prolonged or delayed action or of predetermined successive action of the enclosed medication. For example, the tablet or pill can comprise an inner dosage and outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate phthalate, as described in U.S. Patent 2,196,768), and the like. A particularly advantageous enteric coating comprises a styrene-maleic acid copolymer together with known materials contributing to the enteric properties of the coating.

The liquid form in which the novel compounds of this invention can be incorporated include aqueous dispersions, suitably flavored syrups, emulsions or suspensions with edible oils such as corn oil, cottonseed oil, safflower oil, soybean oil, and the like, as well as elixirs and similar pharmaceutical vehicles. Suitable dispersing or suspending agents for aqueous suspensions include the synthetic and natural gums such as tragacanth, acacia, alginate, dextran, methylcellulose, polyvinylpyrrolidone, gelatin, and the like.

For injectable solutions or suspensions, conventional preservatives, buffers, isotonic agents and suspending agents are advantageously employed. Suitable preservatives include chlorobutanol, myristyl gamma picolinium chloride, benzyl alcohol, the methyl- and proplyparabens, and sodium ethyl mercurithiosalicylate. Potassium chloride is preferred as an isotonic agent. Among the suspending agents which are suitable for present purposes are polyethylene glycol 4000 or 6000, polyvinylpyrrolidone, dextran, methylcellulose, and surfactants such as polysorbate 80.

I claim:
1. A compound having the formula:

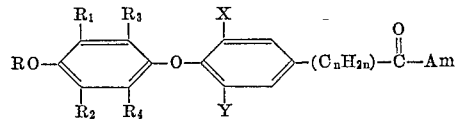

wherein R is selected from the group consisting of hydrogen and lower-alkyl of 1 to 4 carbon atoms, inclusive; $R_1$ and $R_2$ are selected from the group consisting of hydrogen, lower-alkyl of 1 to 4 carbon atoms, inclusive, and halogen; $R_3$ and $R_4$ are selected from the group consisting of hydrogen and lower-alkyl of 1 to 4 carbon atoms, inclusive; X and Y are halogen; $n$ is an integer from zero to 3, inclusive; and Am is di-lower-alkylamino wherein alkyl is of 1 to 4 carbon atoms, inclusive.

2. 2 - [3,5-diiodo-4-(3,5-dimethyl-4-methoxyphenoxy) phenyl]-N,N-dimethylacetamide.

3. 2-[3,5-dibromo-4-(3,5-dimethyl-4-methoxyphenoxy) phenyl]-N,N-diemthylacetamide.

References Cited

Sato, Nippon Naibumpi Gakkai Sasshi, vol. 38, pp. 901–11.

HENRY R. JILES, *Primary Examiner.*

H. I. MOATZ, *Assistant Examiner.*

U.S. Cl. X.R.

260—239, 247.7, 268, 294.7, 326.5, 457, 473, 520, 621, 623, 624, 999; 424—324